US009807668B2

(12) United States Patent
Teyeb et al.

(10) Patent No.: US 9,807,668 B2
(45) Date of Patent: Oct. 31, 2017

(54) MOBILITY STATE AWARE MOBILE RELAY OPERATION

(75) Inventors: Oumer Teyeb, Solna (SE); Muhammad Kazmi, Bromma (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 14/239,003

(22) PCT Filed: Aug. 16, 2012

(86) PCT No.: PCT/SE2012/050877
§ 371 (c)(1),
(2), (4) Date: Feb. 14, 2014

(87) PCT Pub. No.: WO2013/025166
PCT Pub. Date: Feb. 21, 2013

(65) Prior Publication Data
US 2014/0192781 A1 Jul. 10, 2014

Related U.S. Application Data

(60) Provisional application No. 61/523,973, filed on Aug. 16, 2011.

(51) Int. Cl.
*H04W 76/02* (2009.01)
*H04W 36/36* (2009.01)
(Continued)

(52) U.S. Cl.
CPC .......... *H04W 36/36* (2013.01); *H04W 36/32* (2013.01); *H04W 36/34* (2013.01); *H04W 36/14* (2013.01); *H04W 48/18* (2013.01); *H04W 84/005* (2013.01)

(58) Field of Classification Search
CPC ... H04W 76/02; H04W 28/16; H04W 76/046; H04W 36/24; H04W 36/30; H04W 36/32;
(Continued)

(56) References Cited

U.S. PATENT DOCUMENTS

2008/0107076 A1* 5/2008 Ramachandran ... H04W 40/246
370/331
2009/0104911 A1 4/2009 Watanabe
(Continued)

FOREIGN PATENT DOCUMENTS

WO    WO 2012/096611    7/2012

OTHER PUBLICATIONS

International Search Report for International Application No. PCT/SE2012/05087, dated Nov. 7, 2012.
(Continued)

*Primary Examiner* — Ian N Moore
*Assistant Examiner* — Ronald H Davis
(74) *Attorney, Agent, or Firm* — Baker Botts, LLP

(57) ABSTRACT

A mobility state of a mobile relay node is determined as one of three or more different mobility states. The mobile relay node may determine the mobility state itself or based on received information from another network node. Control information is determined based on the determined mobility state of the mobile relay node and an action is then performed or initiated based on the determined control information. The tree different mobility states may include moving, standing, and at least one additional mobility state. Example additional mobility states of the mobile radio node include: departing, arriving, or temporarily stopped.

41 Claims, 5 Drawing Sheets

(51) Int. Cl.
*H04W 36/32* (2009.01)
*H04W 36/34* (2009.01)
*H04W 36/14* (2009.01)
*H04W 48/18* (2009.01)
*H04W 84/00* (2009.01)

(58) Field of Classification Search
CPC ... H04W 36/34; H04W 88/08; H04W 84/005; H04W 28/0226; H04B 1/525; H04B 7/15564; H04L 1/00; H04L 45/28; H04L 47/70

See application file for complete search history.

(56) References Cited

U.S. PATENT DOCUMENTS

| | | | | |
|---|---|---|---|---|
| 2009/0143093 | A1* | 6/2009 | Somasundaram | H04W 36/32 455/525 |
| 2009/0227259 | A1 | 9/2009 | Min | |
| 2010/0093350 | A1* | 4/2010 | Wang | H04J 11/0093 455/436 |
| 2010/0113019 | A1* | 5/2010 | Jeong | H04W 36/0005 455/435.2 |
| 2010/0124934 | A1* | 5/2010 | Mach | H04W 24/02 455/456.1 |
| 2011/0026484 | A1* | 2/2011 | Fox | H04W 60/00 370/331 |
| 2011/0045833 | A1* | 2/2011 | Kazmi | H04W 36/32 455/436 |
| 2011/0086635 | A1* | 4/2011 | Grob-Lipski | H04W 36/32 455/423 |
| 2011/0124330 | A1 | 5/2011 | Kojima | |
| 2011/0124830 | A1 | 5/2011 | Nakahara et al. | |
| 2011/0130141 | A1* | 6/2011 | Frost | H04W 60/02 455/436 |
| 2011/0136522 | A1* | 6/2011 | Wu | H04W 36/0083 455/500 |
| 2011/0250891 | A1* | 10/2011 | Zou | H04W 36/04 455/437 |
| 2012/0088509 | A1* | 4/2012 | Yi | H04W 24/10 455/437 |
| 2013/0005381 | A1* | 1/2013 | Turkka | G01S 11/06 455/517 |
| 2013/0208610 | A1* | 8/2013 | Mach | H04W 24/10 370/252 |

OTHER PUBLICATIONS

PCT Notification Concerning Transmittal of International Preliminary Report on Patentability (Chapter 1 of the Patent Cooperation Treaty) for International Application No. PCT/SE2012/050877, dated Feb. 18, 2014.

PCT International Search Report for International Application No. PCT/SE2012/050877, dated Nov. 7, 2012.

* cited by examiner ized for RNs. An RN coverage cell, as specified in Release-10, Rel-10, appears to a UE as a separate cell distinct from a donor cell of a donor base station that connects the RN to a core network. An RN cell has its own Physical Cell ID, PCI, as defined in LTE Rel-8 and transmits its own synchronization channel, reference symbols, etc. The UE receives scheduling information and HARQ, Hybrid Automatic Repeat-reQuest, feedback and other control signaling directly from the RN and sends its control channel transmissions to the RN. In LTE, a type I relay appears as a Rel-8 enhanced Node B, eNB, (eNB is the term used in LTE for a base station), to Rel-8 UEs, i.e., it is backwards compatible. So from a UE perspective, there is no difference being served by an eNB or a type I relay node.

MOBILITY STATE AWARE MOBILE RELAY OPERATION

PRIORITY

This nonprovisional application is a U.S. National Stage Filing under 35 U.S.C. §371 of International Patent Application Serial No. PCT/SE2012/050877, filed Aug. 16, 2012 and entitled "Mobility State Aware Mobile Relay Operation," which claims the benefit of U.S. Provisional Application No. 61/523,973, filed Aug. 16, 2011 and entitled "Mobility State Aware Mobile Relay Operation."

TECHNICAL FIELD

The technology relates to radio communications, and in particular, to wireless networks that use relay nodes.

INTRODUCTION

Relay Nodes, RNs, can extend the coverage of cellular networks, enhance capacity in hotspots, increase effective cell throughput, and reduce average radio-transmission power at the User Equipment, UE, especially in highly shadowed areas, thereby leading to longer UE battery life. Because of these advantages, Long-Term Evolution, LTE, Advanced corresponding to release 10 of LTE, the standardization of which is currently being finalized in the 3rd Generation Partnership Project, 3GPP, introduced support for RNs. An RN coverage cell, as specified in Release-10, Rel-10, appears to a UE as a separate cell distinct from a donor cell of a donor base station that connects the RN to a core network. An RN cell has its own Physical Cell ID, PCI, as defined in LTE Rel-8 and transmits its own synchronization channel, reference symbols, etc. The UE receives scheduling information and HARQ, Hybrid Automatic Repeat-reQuest, feedback and other control signaling directly from the RN and sends its control channel transmissions to the RN. In LTE, a type I relay appears as a Rel-8 enhanced Node B, eNB, (eNB is the term used in LTE for a base station), to Rel-8 UEs, i.e., it is backwards compatible. So from a UE perspective, there is no difference being served by an eNB or a type I relay node.

An RN is connected to the network via a wireless interface, called Un, to a Donor eNB, DeNB. The DeNB provides backhaul transport for the RN and all the UEs connected to the RN. The signaling and the radio protocols used on the Un interface are based on the LTE Rel-8 standard with only small additions and modifications. An overview of the relay support in LTE Rel-10 is described in 3GPP TS 36.300 in chapter 4.7. Below is a summary of some basic functionalities.

FIG. 1 above shows the overall architecture for connecting RNs 10 in LTE. The RN 10 terminates the S1/X2 interfaces in the same way as a normal eNB 12. The S1 interface is however not directly connected to the Mobility Management Entity, MME/Serving-GateWay, S-GW, node 14 as for normal eNBs, but instead the S1 control messages and data are forwarded over the S1 interface between the RN 10 and the DeNB 16.

The S1 user plane protocol stacks for supporting RNs are shown in FIG. 2. There is a General Packet Radio Service (GPRS) Tunnel Protocol, GTP, tunnel associated with each UE bearer spanning from the S-GW associated with the UE to the DeNB, which is switched to another GTP tunnel in the DeNB, going from the DeNB to the RN, i.e., a one-to-one mapping.

Similarly, the X2 user plane protocol stacks for supporting RNs during inter-eNB handover are also proxied via the DeNB, as shown in FIG. 3. There is a GTP forwarding tunnel associated with each EPS bearer (a UE bearer), subject to forwarding, spanning from the other eNB to the DeNB, which is switched to another GTP tunnel in the DeNB, going from the DeNB to the RN, i.e., a one-to-one mapping.

The user plane packets are mapped to radio bearers over the Un interface. The mapping can be based on the Channel Quality Indicator, CQI, associated with the UE bearer. Different UE bearers with a similar Quality of Service, QoS, can be mapped to the same Un radio bearer.

There are problems with providing high speed "group mobility," where group mobility includes multiple and often many UEs traveling at high speed together, for example in trains and buses. One problem is providing high throughput. Another is how to provide short handover, HO, interruption time for UEs in such scenarios where group mobility occurs. A third problem related to group HO is significant signaling overhead over the air interface. A fourth problem is that the possibility of handover failures increases as many simultaneous or almost simultaneous HO requests are made to a given neighboring cell. Fortunately, mobile RNs help solve many of the problems associated with high speed group mobility.

LTE Rel-10 only supports static or fixed RNs, but mobile RNs are a possible addition to LTE Rel-11. FIG. 4 shows an example mobile relay use scenario where mobile RNs 10B are installed on top of trains and buses, and UEs 18 inside the moving vehicles are radio-connected to these moving RNs instead of external eNBs 12 or fixed RNs 10A. As long as a UE is inside the moving vehicle, it does not have to change its serving node from being the mobile RN, no matter how many cells the vehicle traverses during a journey. Instead, the RN is handed over from one DeNB to another and through that process, the traffic and signaling for all UEs connected to the RN is transferred from the core network to these UEs via another DeNB. Since in this case only the RN is handed over between DeNBs rather than many individual UEs being handed over between eNBs, the radio signaling is substantially reduced. This situation is an example of "group mobility."

Operation of a mobile RN requires re-assignment of the DeNB, a process that can be accomplished in a manner similar to a UE handover. The mobile RN sends measurement reports of the DeNB cells it can "hear" to its currently serving DeNB, and these reports are evaluated to determine when the RN should be relocated to another neighbor DeNB.

The introduction of RNs has its own set of challenges such as different vendors and different management entities. A RN network management architecture illustrated in FIG. 5 shows an Operations and Maintenance, OAM, architecture for a situation where the RN and the eNB are from different vendors and where the DeNB is managed by a Domain Management, DM/Element Management, EM, that is different from the DM/EM of the RN. From the top, the network is managed by the Node Management, NM, system handling equipment from all vendors via a standardized Itf-N interface. Equipment from each vendor is handled by one or several DM systems. Such OAM systems are sometimes called Operations and Support Systems, OSS. These systems manage the Network Elements, NE, which can be eNBs and relay nodes, and also other elements.

In LTE, two eNBs can be interconnected via the X2 interface for information exchange. RNs in the network are controlled, just like any UE by the radio resource control, RRC, protocol, which has been extended with certain relay-specific functionality. Bearers are also set up to carry X2 and S1 interfaces between RN and its donor eNB, as well as to carry OAM traffic between the RN and its DM/EM. If the eNB and the RN are from the same vendor, both nodes can be managed by the same DM/EM.

Another RN challenge pertains to automatic neighbor cell relations involving RNs, and in particular, the limited numbers of PCIs. PCIs are grouped into 168 unique physical layer cell identity groups, each group containing 3 unique identities. Thus, there are only 504 different PCIs altogether, see 3GPP TS 36.211. Limiting the number of PCIs makes an initial PCI detection by the UE during cell search easier, but the limited number of PCIs inevitably leads to the reuse of the same PCI values in different cells. Therefore, a PCI might not uniquely identify a neighbor cell, and each cell additionally broadcasts, as a part of the system information, SI, a globally-unique cell identifier called a cell global identity, CGI. When a new node, e.g., an eNB or a RN is brought into the field, a PCI needs to be selected for each of its supported cells that avoids collision with respective neighboring cells. The use of identical PCI by two cells in close proximity results in interference conditions that might hinder the identification and use of any of them. Otherwise, if both cells have a common neighbor, handover measurements that are based on PCI become ambiguous and lead to confusing measurement reports or even to the handing over of a UE to the wrong cell, which can cause Radio Link Failure, RLF.

The PCI assignment should preferably fulfill the following two conditions: collision-free, where the PCI is unique in the area that the cell covers, and confusion-free, where a cell does not have more than one neighboring cell with an identical PCI. Using an identical PCI for two cells creates a PCI collision, which can be resolved by restarting at least one of the cells and reassigning PCIs upon restart, causing service interruption. PCI confusion, on the other hand, can be resolved by instructing UEs to read the CGI of the concerned neighbor cell. However, this might require the UEs to stop transmitting/receiving from their serving node during the measurement gap time that is required to read the neighbor's system information, which can be in the range of 250 ms. Therefore, a PCI which causes either collision or confusion is undesirable.

Traditionally, a proper PCI is derived from radio network planning and is part of the initial configuration of the node. A network planning tool calculates the possible PCIs for the new cell(s) based on estimated neighbor relations of the new cells, as estimated by cell coverage area predictions. However, prediction errors caused by imperfections in map and building data and due to inaccuracies in propagation models have forced operators to resort to drive/walk tests to ensure proper knowledge of the coverage region and identify all relevant neighbors and handover regions. Even the accuracy of drive/walk tests is questionable as some factors such as seasonal changes, e.g., the falling of leaves or snow melting, can alter the propagation conditions. Also, the inaccuracy of cell coverage and neighbor relation assessment increases with time as the live network and its surroundings evolve over time.

LTE has a feature known as User Equipment Automatic Neighbor Relations, UE ANR, which allows UEs to decode and report the CGI information of neighbor cells, in addition to the PCI which is included in almost all measurement reports, to the serving cell upon request. eNBs maintain a neighbor relation table, NRT, for each of their cells. Apart from the PCI to CGI mapping, each neighbor relation contains other relevant information such as X2 connectivity, i.e., the possibility to communicate via the X2 interface.

The CGIs of the neighbor cells are used when signaling to the neighbor eNB via the MME, since the MME routes the messages based on eNB identity which is a part of CGI. If the policy is to establish X2 for neighbor relations and if X2 is not already available, then the CGI can be used to recover the target node's IP address, see 3GPP TS 36.413, which is used for X2 setup. When the X2 interface, see 3GPP TS 36.421/36.422/36.423, is established, the neighboring eNBs can share information about their served cells including PCIs and CGIs. It is also possible to share such information via OAM.

The measurements are done by the UE on the serving as well as on neighbor cells using some known reference symbols or pilot sequences. Some measurements may also require the eNB to measure the signals transmitted by the UE in the uplink.

In a multi-carrier or carrier aggregation, CA, scenario, the UE may perform the measurements on the cells on the primary component carrier, PCC, as well as on the cells on one or more secondary component carriers, SCCs. The UE measurements are done for various purposes examples of which include: mobility, positioning, self-organizing network, SON, minimization of drive tests, MDT, OAM, network planning and optimization, etc. The UE measurements may also include cell identification, e.g., PCI acquisition of the target cell, CGI or Evolved Universal Terrestrial Radio Access Network (E-UTRAN) Cell Global Identifier (ECGI) acquisition of the target cell, system information acquisition of the target cell. The target cell can be an LTE cell or any inter-Radio Access Technology, RAT, cell etc. Examples of UE mobility measurements in LTE include: reference symbol received power, RSRP, and reference symbol received quality, RSRQ. Examples of UE inter-RAT mobility measurements include: common pilot channel received signal code power, CPICH RSCP, CPICH Ec/No, and Global System for Mobile communications (GSM) Received Signal Strength Indicator (RSSI) measurements. CPICH Ec/No is the received energy per chip divided by the power density in the band and it corresponds to RSCP/RSSI. Examples of UE positioning measurements include: reference signal time difference, RSTD, and Receive-Transmit (RX-TX) time difference measurement.

There are several positioning methods for determining the location of the target device, which can be a UE, a mobile relay, etc. Some examples are: satellite-based methods, observed time difference of arrival (OTDOA), uplink time difference of arrival (UTDOA), enhanced cell identity (E-CID), and hybrid methods that include features from two or more positioning methods. The above positioning methods are briefly described below.

Global Navigation Satellite System, GNSS, is a generic term for satellite navigation systems that enable the target device to locate their position. Another generic term currently used in the literature for satellite based positioning method is Galileo and Additional Navigation Satellite System, GANSS. Among others, the global positioning system, GPS, is the most well known examples of GNSS, and is currently in operation for more than a decade. For simplicity GPS is described, but the technology described here equally applies to any type of navigation satellite system.

The assisted-GNSS, A-GNSS, or assisted-GPS, A-GPS, is tailored to work with the target device and thus enables the device to relatively accurately determine their location, time, and even velocity, which may include direction, in open area environment provided sufficient number of satellites are visible. A-GPS is considered by some to be the most viable and commonly used. The A-GNSS can be UE-based or UE-assisted. In both cases the network node, e.g., eNB, sends assistance data, e.g., satellite information, etc., to the target device to facilitate the GNSS measurements. However, in UE-assisted A-GNSS, the target device reports measurements to the network which in turn determined the location of the device. In UE-based A-GNSS, the target device itself finds its location based on assistance data and measurements.

In OTDOA, the target device, e.g. UE, mobile relay etc, measures the timing differences of downlink positioning reference signals (PRS) received from multiple distinct locations e.g. eNBs. For each measured neighbor cell, the UE measures a Reference Signal Time Difference (RSTD) which is the relative timing difference between a neighbor cell and a reference cell. The UE position estimate is the intersection of hyperbolas corresponding to the measured RSTDs. At least three RSTD measurements from geographically dispersed base stations with a good geometry are needed to accurately determine the UE location coordinates.

In the UE-assisted OTDOA method, the UE sends the RSTD measurements to the positioning node, which in turns uses the RSTD measurements to determine the UE location. In the UE-based OTDOA method, the UE performs RSTD measurements as well as determines its location. In both UE-based and UE-assisted OTDOA, the positioning node, for example the Evolved Serving Mobile Location Center, E-SMLC, in LTE, provides assistance data to the UE to facilitate the RSTD measurements. The assistance data includes information such as cell identities, reference timing of the cells, PRS bandwidth, periodicity of PRS, etc.

In the UTDOA positioning method, several network radio nodes called location measurement units, LMU, perform measurements on uplink signals transmitted by the target devices. The LMU is either located as a separate unit in an existing network or typically located at, e.g., eNB or BS or DeNB sites. The LMUs communicate with the positioning node, e.g., E-SMLC in LTE. The LMUs send measurements performed on UE uplink (UL) signals to the positioning node which in turn determines the location of the target device.

The E-CID positioning method uses the network knowledge of geographical areas associated with cell IDs and additionally one or more UE and/or base station measurements to determine the location of the target device, e.g. UE, mobile relay, etc. The measurements include at least the Cell Identification, CID, and the corresponding geographical location (e.g., coordinates) of the serving cell. Examples of additional measurements are:

1—Timing Advance (TA). TA is derived from eNB Rx-Tx time difference measurement and/or UE Rx-Tx time difference measurement.
2—Angle of arrival (AoA) measured at the base station.
3—Signal strength measurement e.g. path loss/path gain, RSRP from serving and neighboring cells.
4—Signal quality measurement e.g. RSRQ from serving and neighboring cells.
5—Inter-RAT measurements e.g. CPICH RSCP, CPICH Ec/No, GSM carrier RSSI, etc.

A fingerprinting positioning method typically makes use of signal strength/signal quality, e.g., RSRP/RSRQ. Therefore, fingerprinting is a special type of E-CID positioning method.

Hybrid positioning methods combine more than one positioning method to enhance the positioning accuracy of the target device. For example, the A-GNSS measurements and E-CID measurements can be used in combination to determine the location of the target device such as a UE or a mobile relay.

With the introduction of mobile RNs in wireless communication systems, there are a number of issues relating to the mobility of a mobile RN in relation to other radio nodes and radio communication equipments/devices in a wireless communication system that need to be addressed.

What is needed is technology for resolving these and other problems with mobile RNs. In particular, a solution is needed to address the problems related to the group mobility of high speed users which occurs in a scenario where UEs are served by a mobile relay node. More specifically, a solution is needed to ensure that UEs in a vehicle carrying a mobile relay node remain camped on or connected to their serving mobile relay node when they are in the vehicle and are also able to perform measurements for mobility on neighboring cells to their serving mobile relay node, whenever such measurements are necessary or desirable.

SUMMARY

A mobile radio node includes radio circuitry configured to communicate with one or more user equipments, UEs, and processing circuitry configured to: determine a mobility state of the mobile radio node as one of three or more different mobility states, determine control information based on the determined mobility state of the mobile radio node, and perform or initiate an action based on the determined control information. For example, three different mobility states be moving, standing, and at least one additional mobility state. Examples of an additional mobility state of the mobile radio node include departing, arriving, or temporarily stopped. The mobile radio node may determine the mobility state itself or based on received information from another network node.

In one example embodiment used in the detailed description for illustration purposes, the mobile radio node is a mobile relay node. But the mobile radio node may also be a mobile radio base station, for example one of: an access point, a macro base station, a micro base station, a pico base station, a femto base station, a home base station, another relay node, or a repeater.

In an example embodiment, the processing circuitry signals the detected mobility state of the mobile radio node to one or more other network nodes, e.g., when the radio node attaches to a donor base station, the mobile radio node changes mobility state, periodically, or upon receipt of a specific request from the one or more network nodes. The mobile radio node may be a serving base station serving one or more UEs and the one or more other network nodes may be a donor base station serving the mobile radio node.

Example control information includes one or more of: mobility control information, measurement control information, cell selection control information, cell reselection control information, handover control information that reduces a probability of ping-pong handovers.

Example measurement control information includes one or more of mobility measurement control information, positioning measurement control information, measurement control information for a self-organizing network, SON, and measurement control information for a minimization of drive tests, MDT.

In example embodiments, the processing circuitry may be configured to prevent or to penalize handovers to or from the mobile radio node when the mobile radio node is in a moving mobility state.

A mobility state of the mobile radio node may be detected directly or indirectly. Examples techniques for detecting mobility state may include the use of one or more of the following: one or more satellite-based position determining techniques, one or more non-satellite position determining techniques, one or more motion detectors, one or more speed detectors, one or more vehicle sensors, one or more radio measurements, or one or more user inputs. A mobility state of the mobile radio node may be detected: (1) using a location of the mobile radio node and coordinates of stopping locations for the mobile radio node, (2) based on predetermined start and stop times of the mobile radio node, and/or (3) based on whether a stopping point for the mobile radio node is within a coverage area of a donor base station currently serving the mobile radio node.

In example embodiments, the mobile radio node broadcasts signals or sends dedicated signaling, via the radio circuitry, of the detected or determined mobility state of the mobile radio node to one or more UEs for use by the one or more UEs in conducting a mobility procedure, a measurement procedure, a handover procedure, a cell selection procedure or a cell reselection procedure. For example, the broadcast signaling may be sent for UEs in idle state, also denoted idle mode, and dedicated signaling may be sent for UEs in connected state, also denoted connected mode.

In example embodiments, the mobile radio node sends, via the radio circuitry, the detected or determined mobility state of the mobile radio node to one or more neighboring UEs in a neighboring cell for use by the one or more neighboring UEs in conducting a mobility procedure, a handover procedure, a measurement procedure, a cell selection procedure or a cell reselection procedure.

Another aspect of the technology includes a user equipment, UE, that includes radio circuitry configured to communicate with a mobile radio node, e.g., a mobile relay node, and processing circuitry configured to: determine a mobility state of the mobile radio node as one of three or more different mobility states, determine control information based on the determined mobility state of the mobile radio node, and perform or initiate an action based on the determined control information. Three different mobility states may be moving, standing, and at least one additional mobility state.

In example embodiments, the UE processing circuitry determines a mobility state of the mobile radio node as one of the following: moving, standing, departing, arriving, or temporarily stopped.

The UE may determine the mobility state based on information related to the mobility state of the mobile radio node received from a base station.

The UE may obtain configuration information from the mobile radio node corresponding to the mobile radio node's mobility state.

The following include non-limiting, example embodiments that depend on whether the UE has a connection with the mobile radio node, i.e., whether the UE is in connected mode and is being served by the mobile radio node. For example, if UE has a connection with the mobile radio node, the UE may prevent or penalize handover of the connection when the mobile radio node is in a moving or temporarily stopped mobility state. The UE may for example prevent handovers by not performing measurements for handover candidacy on the cells concerned. The UE may for example penalize handovers by applying a high threshold to measurement results before reporting a cell as candidate for handover. If the UE has a connection with the mobile radio node and the mobile radio node is in a moving mobility state or a temporarily stopped mobility state, the UE may stop measuring cells for handover candidacy, or if the UE is in idle state and is camped on the mobile radio node, the UE may not perform cell reselection to other cells not served by the mobile radio node. If the UE is in idle state and is camping on a cell served by the mobile radio node and the mobile radio node is in a moving mobility state or a temporarily stopped mobility state, the UE may prevent or penalize measurement on other cells not served by the mobile radio node. If the UE is in idle state but is not camping on a cell associated with the mobile radio node and the mobile radio node is in a moving mobility state or a temporarily stopped mobility state, the UE may prevent camping on the cell associated with the mobile radio node. The UE may for example do this by not measuring on the cell associated with the mobile radio node. If the UE has a connection with the mobile radio node, or if the UE is in idle state and camping on a cell served by the mobile radio node, the UE may measure signals from cells other than the cell being served by the mobile radio node for handover of the connection or for cell reselection when the mobile radio node is in an arriving mobility state. If the UE does not have a connection with the mobile radio node, the UE may measure signals transmitted by the mobile radio node for possible handover connection when the mobile radio node is in an arriving mobility state. If the UE has a connection with the mobile radio node, the UE may permit handover of the connection when the mobile radio node is in a standing mobility state. If the UE is in idle state and the mobile radio node is in a standing mobility state, the UE may perform cell reselection to other cells. When the mobile radio node is in a standing mobility state and the UE is in connected state but not connected to the mobile radio node, the UE may measure on signals transmitted by the mobile radio node for handover candidacy and/or to report measurements made on signals transmitted by the mobile radio node for handover candidacy. When the mobile radio node is in a standing mobility state and the UE is in idle state, the UE may camp on a cell associated with the mobile radio node. If the UE has a connection with the mobile radio node, the UE may prevent an outbound handover of the connection when the mobile radio node is in a departing mobility state. The UE may for example prevent the outbound handover by not performing measurements for handover candidacy on the cells concerned. If the UE has a connection with the radio node, the UE may not measure for handover of the connection when the radio node is in a departing mobility state. If the UE is in idle state but not camping on a cell served by the mobile radio node and the mobile radio node is in a departing mobility state, the UE may prevent cell reselection to the cell served by the mobile radio node. When the mobile radio node is in a departing mobility state and the UE is moving with the mobile radio node and camping on a cell served by the mobile radio node, the UE may not perform a cell reselection.

Other aspects of the technology include methods performed by and in accordance with the mobile radio node and UE described above.

Still other aspects of the technology include a computer product embodied in a non-transitory, computer-readable storage medium containing instructions, which when executed by processing circuitry, perform the functions described above for the mobile radio node and a computer product embodied in a non-transitory, computer-readable storage medium containing instructions, which when executed by processing circuitry, perform the functions described above for UEs.

DETAILED DESCRIPTION

Figure 1:
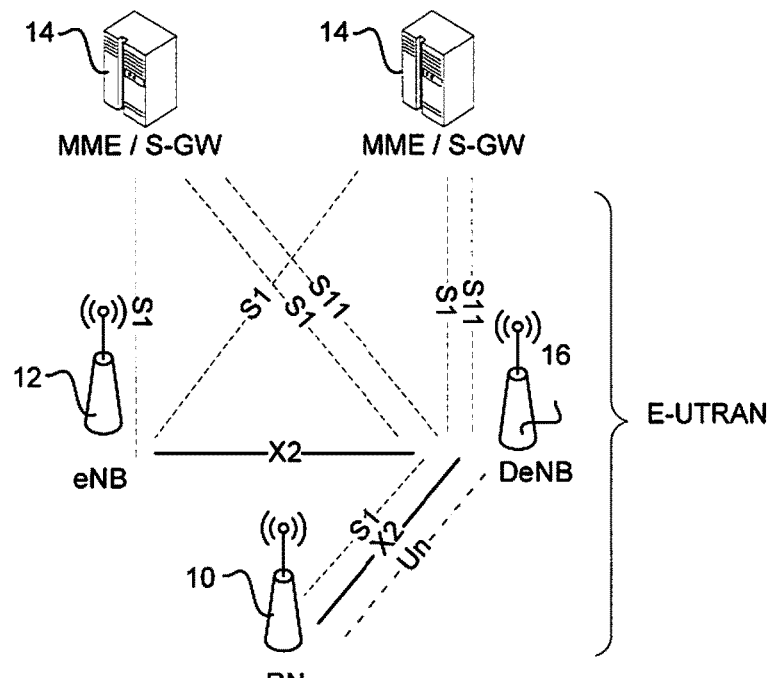
FIG. 1 illustrates an example E-UTRAN Architecture supporting RNs.
Figure 2:
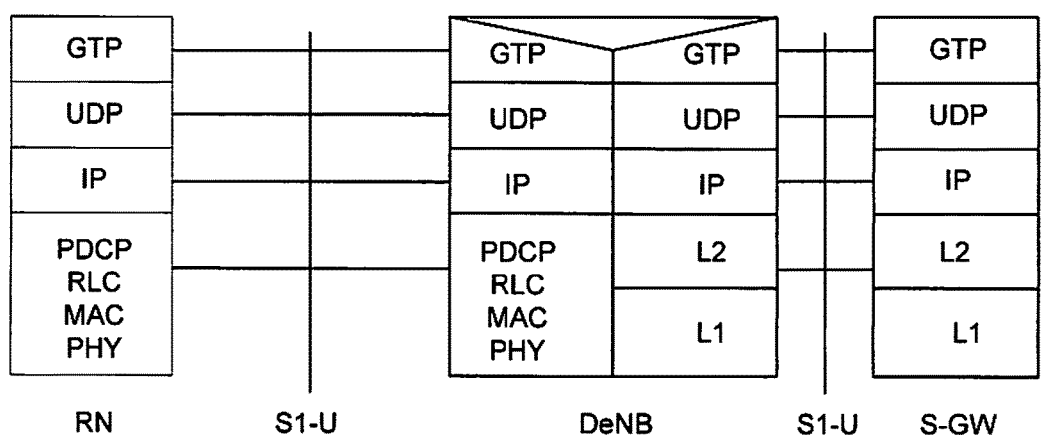
FIG. 2 is an example S1 user plane protocol stack for supporting RNs.
Figure 3:
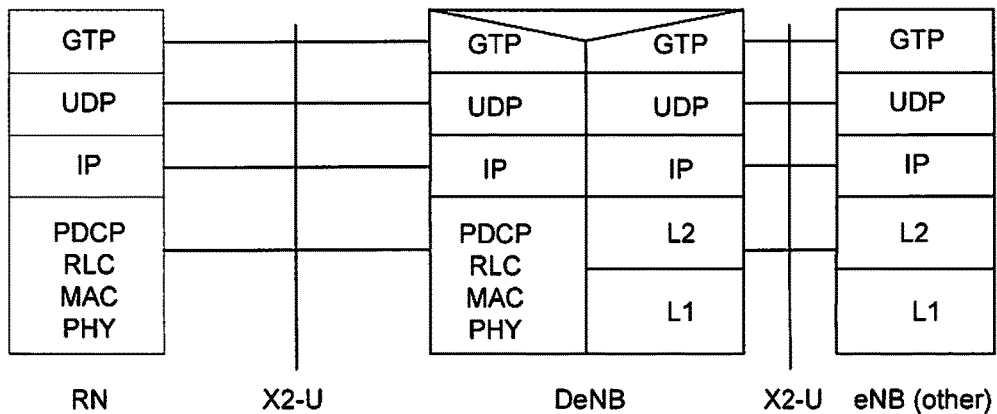
FIG. 3 is an example X2 user plane protocol stack for supporting RNs.
Figure 4:
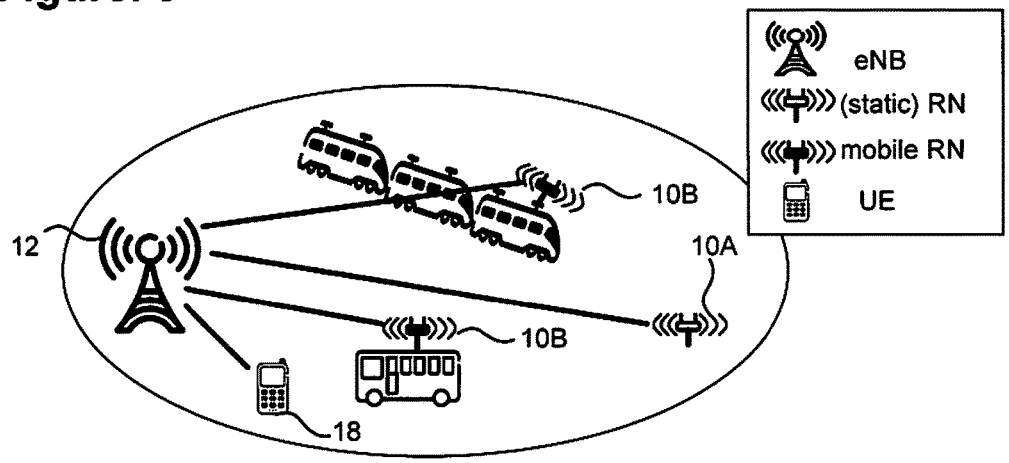
FIG. 4 illustrates a non-limiting example mobile RN usage scenario.
Figure 5:
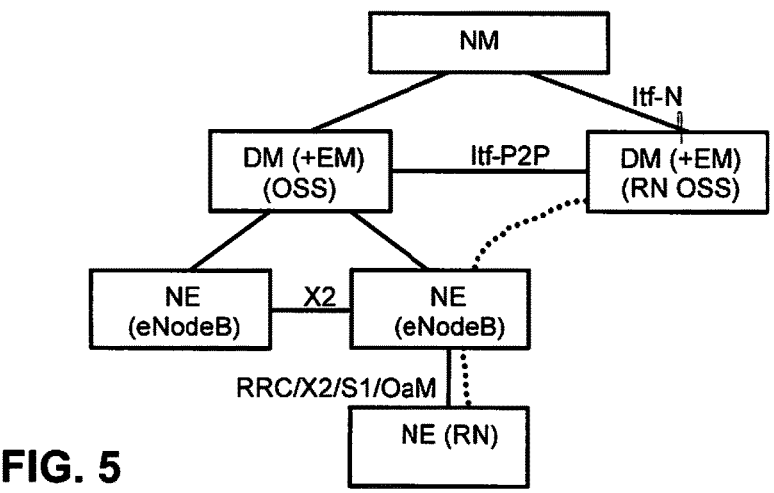
FIG. 5 is a non-limiting example function block diagram of an OAM architecture for a case when the DeNB is managed by a DM/EM that is different from the DM/EM of the RN.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not to obscure the description with unnecessary detail. Those skilled in the art will appreciate that the functions described may be implemented in one or more nodes using hardware circuitry, e.g., analog and/or discrete logic gates interconnected to perform a specialized function, ASICs, PLAs, etc., and/or using software programs and data in conjunction with one or more digital microprocessors or general purpose computers. Nodes that communicate using the air interface also have suitable radio communications circuitry. Moreover, the technology can additionally be embodied within any form of non-transitory, computer-readable memory, such as solid-state memory, magnetic disk, or optical disk containing an appropriate set of computer instructions that would cause one or more processors to carry out the techniques described herein.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be implemented by computer program instructions that may be stored in a non-transitory, computer-readable storage medium and which when executed by one or more computers or processors cause the processes to be performed, whether or not such computer(s) or processor(s) is(are) explicitly shown.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and, where appropriate, state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The functions of the various elements including functional blocks, including but not limited to those labeled or described as a computer, processor, or controller, may be provided through the use of hardware such as circuit hardware and/or hardware capable of executing software in the form of coded instructions stored on non-transitory, computer-readable medium. Thus, such functions and illustrated functional blocks are to be understood as being either hardware-implemented and/or computer-implemented, and thus machine-implemented.

The technology improves the performance of mobile radio nodes and other nodes operating with them by taking into account mobile radio node mobility state information. As mentioned above, the example of a mobile radio node used for illustration below is a mobile relay node. For example, inbound and outbound handovers to/from mobile relays, as well as cell (re-) selections, are enhanced by aligning the behavior of the mobile relay, the DeNB, neighboring nodes, and UEs with the mobile relay's mobility state. If the current mobility state of the mobile relay node (RN) is known, e.g., by the mobile RN, DeNB, neighboring nodes, and/or UEs, then the activation/deactivation of certain mobility features and/or the modifications of system parameters may be performed so that handover measurements and executions, as well as cell (re-)selections, are performed preferably only when necessary. The probability of ping-pong handovers as well as temporary camping in the wrong cell, e.g., a UE outside the vehicle carrying the mobile relay node camping on the relay node cell or a UE inside the vehicle carrying the mobile relay node camping on a fixed neighbor cell, is also reduced. This ping-pong handover situation would otherwise become prevalent if the behavior of the RN, DeNB, neighbor nodes, and UEs did not take into account the mobile relay node's mobility state.

More generally, improved and even optimal performance of mobile relay nodes may be achieved if the relay's behavior is aligned with its mobility state. The mobile RN configures its control signaling so that UEs, including relayed UEs as well as those in neighboring cells, perform appropriate handover measurement and execution, as well as proper cell (re-)selection, based on the mobility state of the mobile RN. A change in the mobility state of the mobile RN is detected, which may optionally be followed by signaling of RN mobility state information to other network nodes, e.g., DeNBs. Control information, e.g., mobility related parameters, are modified or updated depending on the detected mobility state of the mobile RN. UE and mobile RN operation is then controlled in accordance with the modified or updated control information associated with the mobility state of the mobile RN.

Figure 6:
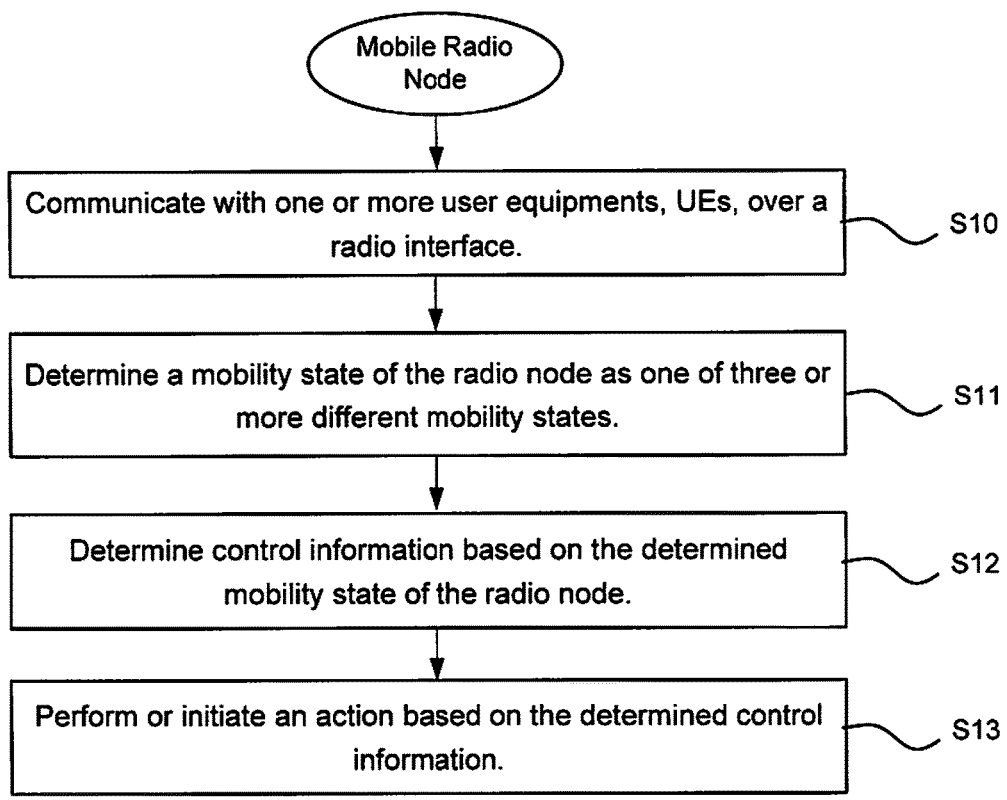
FIG. 6 is a flowchart illustrating non-limiting example steps performed by a mobile radio node in accordance with an example embodiment.

FIG. 6 is a flowchart illustrating non-limiting example steps performed by a mobile radio node, as exemplified in a mobile relay node, in accordance with an example embodiment. Step S10 indicates that the mobile radio node is communicating with one or more user equipments, UEs, over a radio interface. Then in step S11, the mobile radio node determines a mobility state of the radio node as one of three or more different mobility states. The mobile radio node determines control information based on the determined mobility state of the mobile radio node (step S12), and performs or initiates an action based on the determined control information (step S13).

Figure 7:
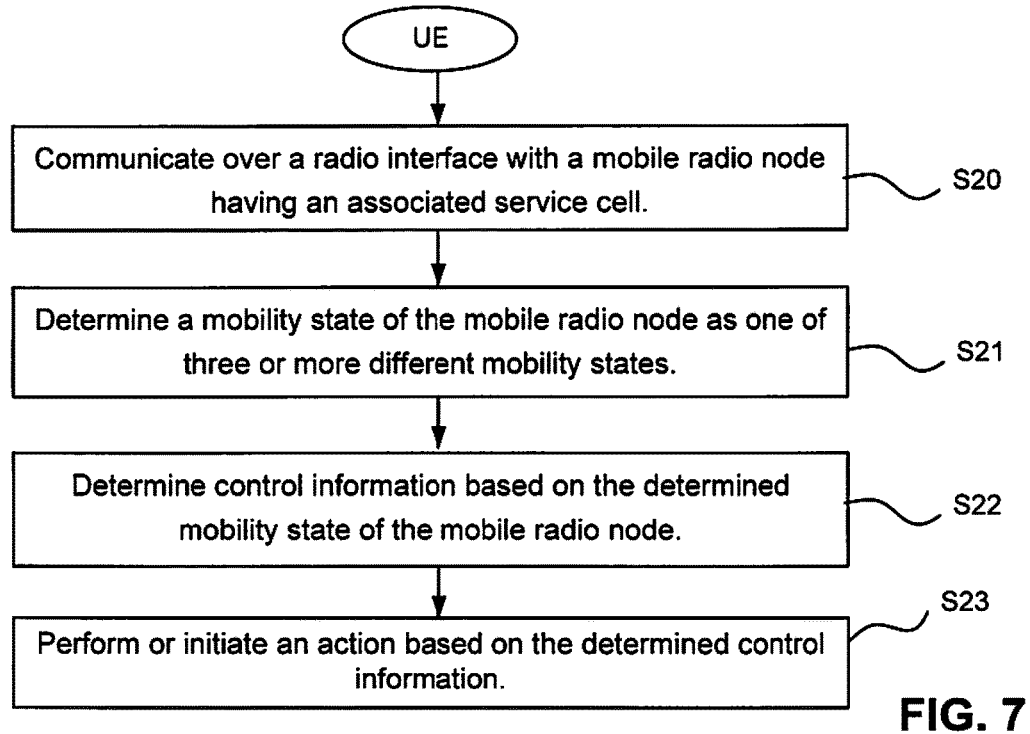
FIG. 7 is a flowchart illustrating non-limiting example steps performed by a UE in accordance with an example embodiment.

FIG. 7 is a flowchart illustrating non-limiting example steps performed by a UE in accordance with an example embodiment. The UE communicates over a radio interface with a mobile radio node (step S20), and determines a mobility state of the mobile radio node as one of three or more different mobility states (step S21). The UE determines control information based on the determined mobility state of the mobile radio node (step S22), and performs or initiates an action based on the determined control information (step S23).

Various non-limiting example embodiments are described below that include one or more of the following: mobility states of a mobile radio node such as a mobile relay node, methods of detecting mobile radio node mobility states, e.g., a mobile relay node mobility state, methods of reporting mobility state to other network node(s), and UE and mobile radio node operation in different mobility states.

Consider for example a mobile relay node being in one of two states: moving when the vehicle to which the mobile relay node is attached to is moving, e.g., cruising at some speed, and standing when the vehicle is at a stop and users are embarking and disembarking. This is a simple example of a relay mobility state model.

Figure 8:
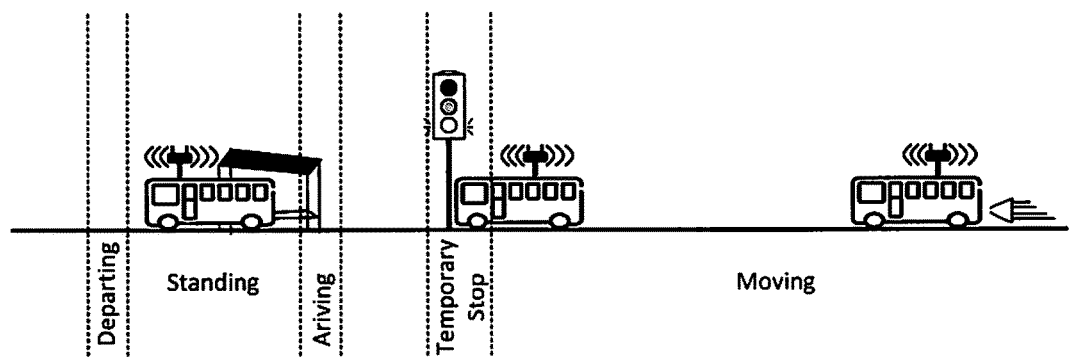
FIG. 8 illustrates non-limiting example mobile radio node states.
Figure 9:
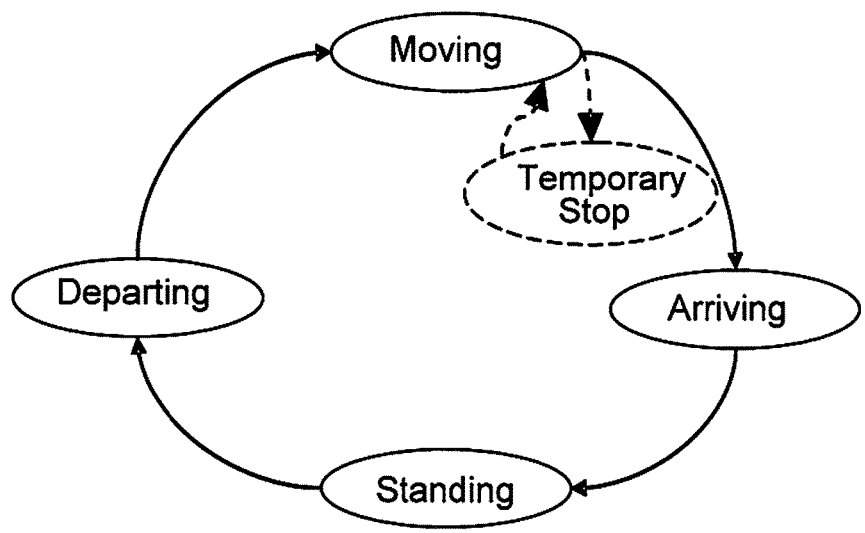
FIG. 9 illustrates non-limiting example mobile radio node state transitions.

In another more elaborate example, consider the mobile relay node being in one of five mobility states illustrated in FIGS. 8 and 9: (1) moving—the vehicle to which the mobile relay node is attached is moving, e.g., cruising at some speed, (2) standing—the vehicle is at a stop and users are embarking and disembarking, (3) departing—a short duration during which the vehicle is leaving the bus/train stop at moderate speed, (4) arriving—a short duration during which the vehicle is slowing down to stop at the bus/train stop, and (5) temporary stop—the vehicle is stopping for a short duration, e.g., at a traffic light, because of traffic congestion, etc., but no user is embarking or disembarking.

In the simpler 2-state model e.g., a 2-state moving and standing mobility state model, one or more of the other states of the more sophisticated model may be considered as a variation of one of these basic states. For example, 'temporary stop' may be viewed as a variation of the 'standing mobility state,' whereas 'departing' and 'arriving' may be viewed as a variation of the 'moving mobility state'. Example embodiments also apply to a mobile relay node scenario with any number of mobility states beyond those mentioned in the above examples.

Example mechanisms to identify the different mobility states are now described, followed by non-limiting example embodiments describing desired operation/behavior during each state and how to achieve them.

In order to align the mobile relay's operation/behavior with its mobility state, the mobile relay's mobility state has to be identified either by the mobile relay itself or another network node. This may be done using one or more of the following example mechanisms: positioning methods, non-positioning methods, and combined methods that use some elements of a positioning method and some elements of a non-positioning method.

In one non-limiting example embodiment, a mobile relay node is equipped with a suitable positioning system, which is used to determine its mobility state. The positioning method used for the mobility state determination can be satellite-based, e.g. GNSS, or non-satellite based or even a hybrid method, which uses elements of two or more positioning methods for positioning, e.g., GNSS and observed time difference of arrival, OTDOA. Examples are now described.

A standalone GNSS method, e.g., GPS, or assisted-GNSS, A-GNSS, e.g., A-GPS, can be used for determining the mobility state of the mobile relay node by determining the relay location comprising relay co-ordinates, speed, direction, etc. The determined position may then be mapped to a pre-determined vehicle's route. For example, a pre-defined table containing co-ordinates of all possible vehicle stops can be stored in the mobile relay node. Information about major intersection and traffic stops are often already available in many GNSS applications, making it easy to also map the positions where the mobile relay node will be in the temporarily stopped mobility state.

The example A-GNSS method for determining a mobile relay's location can be relay-assisted or relay-based. In the former case, the mobile relay node reports GNSS measurements to another network node, e.g., a DeNB, which in turn determines the mobile relay node location. In the latter case, i.e., the relay-based case, the mobile relay node itself determines its location and thus also its mobility state. If a relay-assisted A-GNSS method is used, then one possibility is that the network node, e.g., a DeNB, also determines the mobility state of the mobile relay node after finding its location. This means the network node, e.g., the DeNB, maintains the pre-defined map and route followed by the vehicle containing the mobile relay node. The network node, e.g., the DeNB, therefore sends the relay mobility state to the mobile relay node over a relevant interface, e.g., the Un interface. Such an information element carrying the mobile relay node's mobility state may or may not need to be standardized.

A GNSS-based positioning system might not be available all the time, for example, in metros where the GNSS, e.g. GPS, signal is unavailable or unreliable. In another non-limiting example embodiment, this problem is solved by using a non-satellite based positioning method, e.g., enhanced cell ID, OTDOA, UTDOA etc. For example, in the case of an enhanced cell ID, E-CID, positioning method, the mobile relay node and/or its DeNB may perform measurements such as Rx-Tx time difference measurements, angle of arrival (AoA) of signals, signal strength measurements, etc. The location may be determined by a positioning node, which in turn may report the location information to the mobile relay node. The positioning node may determine the mobility state of the mobile relay node by using the E-CID measurements and the pre-defined route information of the vehicle carrying the mobile relay node.

Another example enhanced cell ID method is fingerprinting of neighboring fixed cells. Fingerprint mapping may be done in several ways. For example, a special fingerprint mapping trip along the normal route of the vehicle may be arranged by the operator before the mobile relays become fully operational, where the mobile relay node acts like a UE all the time. Then, at each stop, the mobile relay node notes all the cells that it can "hear" and constructs a mapping of stops and neighboring cells. A faster, but less reliable, fingerprinting mechanism collects the DeNBs to which the mobile relay node is attached at each stop. Later on, when the mobile relay node is fully operational, the handover of the mobile relay node to one of these DeNBs triggers a mobility state change to the standing mobility state.

In any type of E-CID method, the mobile relay node may also report measurements, e.g., RSRP/RSRQ, Rx-Tx time difference, etc., done on fixed neighboring cells to the positioning node. The donor node or donor base station, e.g., the DeNB, may also report measurements such as timing advance, TA, of the mobile relay node to the positioning node. The positioning node uses the received measurements to find at least the mobile relay's location. In one example, the positioning node reports the relay location to the mobile relay node or to the donor node, e.g., the donor base station or DeNB. In this case the mobile relay node and/or the donor node uses the location information to determine the mobility state of the mobile relay node. In another example, the positioning node sends the relay location as well as relay mobility state to the mobile relay node or to the donor node. Hence, new signaling between donor node and mobile relay node, i.e., over the Un interface, may be defined in case the donor node, e g the donor base station, signals the mobile relay mobility state to the mobile relay node. Similarly, new signaling also may be defined between the positioning node and mobile relay node, e.g., over the LTE Positioning Protocol (LPP) interface, in case the positioning node signals the mobile relay mobility state to the mobile relay node.

In a hybrid positioning method, the mobile relay node uses more than one positioning method to determine its mobility state. The hybrid method used by the mobile relay node depends upon its capability such as the types of positioning measurements that can be performed by the mobile relay node. The particular hybrid method also depends upon a particular scenario. For instance, when a vehicle passes through a dense urban area or is in a tunnel, the A-GNSS may not be usable or accurate enough even though the mobile relay node is A-GNSS capable. In one example, the mobile relay node may use A-GNSS and E-CID measurements for finding its location and eventually its mobility state. In another example, the mobile relay node may use A-GNSS and OTDOA measurements and so on.

In a hybrid method, the relay mobility state may be determined by: (1) the mobile relay node autonomously using location information which can be provided by another node, e.g., positioning node, (2) a positioning node, e.g., an Evolved Serving Mobile Location Center, E-SMLC, using relay location information and pre-defined vehicle route, or (3) the donor node, e.g., DeNB, using relay location information acquired from a positioning node and a pre-defined vehicle route.

While the route for some public transport vehicles is typically fixed, for example, automated trams that stop at every station, there are exceptions. For example, buses may not stop at every station, unless there is a passenger that pushes the stop button. Also, trains may skip some stops for several reasons. Furthermore, the positioning methods for determining a relay node's mobility state may not be available; for instance, a mobile relay node may not be equipped with a positioning method.

Other non-limiting example embodiments address these situations by supplementing the location based mobility state in several ways without using a positioning mechanism. These methods may be classified into two groups: methods using the vehicle's equipment and methods using radio measurements.

Equipment located in the vehicle for various purposes such as for the assistance and guidance of driver, staff, and passengers can be used by the mobile relay to detect its mobility state. The mobile relay node acquires the output signal, e.g., a physical pressing of a button by a subscriber is translated into an electrical signal, from such equipment and maps the acquired signal into the relevant mobility state. This requires an interface or connection between the vehicle equipment and the mobile relay node. Some example equipment which may be used to assist the mobile relay node in detecting its mobility state are now described. Motion detectors may be used to determine whether the vehicle is moving or standing, e g to differentiate the standing mobility state from the other mobility states. Speedometers may be used to provide the speed of the vehicle to the mobile relay node to be used to differentiate between standing, moving, departing, and arriving mobility states. Door sensors may be used to detect the opening and closing of the vehicle's door so as to identify the standing and departing mobility states. User interaction may be used. For example, the driver activating the brake or a passenger pushing the STOP button may be used to identify the arriving mobility state from the other mobility states.

In some scenarios, such as with automated trams, it may be possible to have an exact timing of the vehicle's itinerary. In another example embodiment, the vehicle's timetable is made available to the mobile relay node. The mobile relay node initializes a state machine at the start of the station where vehicle stops, and the mobility state is changed according to this periodic mapping table, which maps for example the mobile relay and times at which it arrives, departs and temporarily stops at different predetermined locations.

Radio measurements, e.g., RSRP, RSRQ, etc., may be performed on signals from one or more neighbor cells by the mobile relay node and/or by the relay's UEs, i.e., the UEs connected to the mobile relay node. For example, if the UE and/or mobile relay measurements do not change over a certain time, e.g., 1-2 seconds, then it may be assumed that the vehicle is in a standing mobility state. Otherwise, the vehicle may be assumed to be in a moving mobility state. Due to moving objects in the mobile relay's surroundings, measurement values may change. The typical or even worst case variation of a reference measurement at a particular location when the vehicle is stationary may be determined, e.g., using a survey. The variation of the actual measurement may therefore be compared with the typical or worst case variation of the reference measurement when determining the vehicle mobility state, e.g., whether it is standing or moving. The actual measurements and the reference measurements may also be done on the signals from the same cell(s) to further enhance the precision in determining the vehicle or mobile relay state. Since the vehicle carries the mobile relay, the terms vehicle mobility state or mobile relay mobility state are interchangeably used.

In another non-limiting example embodiment, the mobile relay node may use both positioning and non-positioning methods to improve the accuracy in determining its mobility state. Any combination of such methods described above may be used by the mobile relay node to find its mobility state. For instance, the A-GNSS positioning method may be used for finding a mobile relay node's location, and the mobile relay node further confirms its state by using door sensors. For example, consider a vehicle that is scheduled to stop at certain locations, e.g., at bus stations. The A-GNSS may enable the relay to find the location of the bus station. However, there may be times when no passengers embark or disembark at a particular bus station so the bus may continue without stopping at this particular bus station. Thus, the use of a door sensor confirms whether the bus is standing or not, i.e., whether to change the mobility state of the mobile relay node from arriving to standing or not.

The mobile relay node, upon detecting its mobility state by using one or more techniques/mechanisms, may also signal its state information to one or more network nodes or to UEs. The mobile relay node may report its mobility state to one or more network nodes under one or more scenarios such as: (1) when attaching to a DeNB, (2) when relay mobility state changes, (3) periodically, and/or (4) upon receiving explicit request from the network node, e.g., DeNB, etc.

In one non-limiting example embodiment, the mobile relay node may signal its mobility state to its donor node, i.e., to the donor node that it is currently attached to, e.g., a DeNB. This may be done either on a request-response basis or incorporated as part of a mobile RN attachment procedure. For example, when a mobile RN is handed over to a target donor node/base station, it may communicate its current mobility state, either during the initial attach procedure or later on when X2 is established.

The donor node may use the acquired mobility state information for various purposes and actions. For example, the donor node, e.g., DeNB, may perform configuration and reconfiguration of mobility related parameters. The parameter setting and their values configured by the donor node depends upon the relay mobility state. The donor node may forward mobility state information of its current relay node cells, i.e., of the cells served by the mobile relay node(s) currently attached to the donor node, to relevant neighboring nodes, so that the neighboring nodes may act according to the mobility state of the mobile relay node. The donor node may also forward the acquired mobility state information of its mobile relay nodes to other network nodes, e.g., to one or more core network nodes, positioning nodes, etc.

The mobile relay node may also directly report its mobility state to network nodes other than the donor node. Examples of other network nodes are core network nodes such as an MME, a positioning node, a Minimization of Drive Tests, MDT, node, a SON node, an O&M or Operational Support System, OSS, node, a network monitoring and planning node, etc.

The mobile relay node may indicate its mobility state to UEs under its control. One example way may be using mobility state identifiers. The UE may use received mobile relay node mobility state information to select or modify certain procedures or adapt parameters associated with a certain procedure or task, e.g., a mobility procedure, a measurement procedure, etc. The measurement procedures and measurements may be of any suitable type, e.g., mobility measurements, positioning measurements, measurements for SON, for MDT, etc.

The adaptation of the procedure or parameters by the UE depending upon the relay mobility state may be governed by a pre-determined rule or by signaling from the mobile relay node. For example, in a moving mobility state, the UE may use a measurement procedure #1, and in a standing mobility state, it may use a measurement procedure #2. In measurement procedure #1 and measurement procedure #2, the UE may respectively use a longer measurement period and a shorter measurement period for performing a measurement. Similarly, the UE may use different measurement sampling periods in measurement procedure #1 and measurement procedure #2. The UE obtains measurement samples during the measurement period, and the obtained measurement samples are averaged over the measurement period to obtain final measurement results. The adaptation of the procedure may reduce processing and complexity in the UE and may also improve the measurement performance and overall mobility performance.

In another example, UEs, upon obtaining the information about the mobile relay node mobility state, may also change their operation/behavior related to cell (re-)selection and handover measurements accordingly. There are two main RRC mobility states of the UE: RRC IDLE state and RRC connected state, which are interchangeably called RRC IDLE mode and RRC connected mode, respectively. For the sake of brevity, they are also called as IDLE state and connected state or IDLE mode and connected mode. The mobile relay node mobility state may be communicated to UEs in a connected mode via dedicated messages, e.g., by Radio Resource Control, RRC, signaling, or broadcasted in an additional information element, IE, in a System Information Block, SIB, for UEs in IDLE state or mode.

The mobile relay node may indirectly indicate its mobility state to non-relayed UEs, i.e., UEs in neighboring cells, so that they can use the information to change their behavior/operation related to the concerned relay node for cell (re-) selection and handover purposes. The relay cell is served by a relay node. Non-relayed UEs, i.e., UEs that are served by a radio node which is not a relay node, may read the broadcasted mobility state information. A Closed Subscriber Group, CSG, which is often used for femto type base stations, also known as HeNBs in LTE and HNB in HSPA, may also be employed. For example, a certain CSG-ID, the 27 bit identifier used to differentiate a CSG cell, to which no UE will have a membership, may be reserved for use by mobile RNs when they are in the moving mobility state. That is, once the mobile relay node enters the moving mobility state, it starts broadcasting this CSG-ID in its SIB1. The mobile relay node may also use different PCIs or ECGIs based on its mobility state, e.g., reserved PCIs or ECGIs are described below.

The relayed UEs, i.e., the UEs that are served by the mobile relay node, may report the statistics of the mobile relay node to other network nodes, e.g., an MDT node. The network nodes may use the acquired information for network management, planning, and configuration of parameters to improve the network performance.

The following describes the operation/behavior of UEs connected to or camping on cells served by the mobile relay node as well as of UEs camping on or connected to cells that are currently neighbors to the cells served by the mobile relay node when the mobile relay node is in different example mobility states. Examples of possible UE operation/behavior in a moving mobility state include: (1) inbound and outbound handovers to/from the relay cell, i.e., the cell served by the mobile RN, are prevented or at least penalized with a high offset; (2) relayed UEs stop measuring other cells, i.e. cells which are neighbor to the serving relay cell of the UE, for handover candidacy; (3) relayed UEs in IDLE state or mode do not perform cell reselection to other cells; (4) non-relayed UEs in (temporary) neighboring cells do not measure the relay cell for handover candidacy, and (5) non-relayed UEs in (temporary) neighboring cells in IDLE state do not camp on the relay cell.

Several example mechanisms may be employed. In one non-limiting embodiment, the mobile RN rejects any incoming handover requests while it is in the moving mobility state. The mobile RN may communicate the reason for the rejection by sending an S1/X2 HANDOVER PREPARTION FAILURE message with a new failure cause value of "handover rejected due to RN mobility," see 3GPP TS 36.413, 3GPP TS 36.423. The DeNB, if it is aware of the relay's mobility state, may short circuit inbound handover requests and respond with a HANDOVER PREPARATION FAILURE message on behalf of the mobile relay node when the mobile relay node is in the moving mobility state. From this rejection cause value, neighbor cells may learn that the target cell belongs to a moving RN and thus not try to perform handover to that cell. However, the mobile relay node may be stationary at another instant, and handover may be needed. For example, assume a first case where HO rejection was due to a normal train/bus stop being skipped due to some reason, but at later time the train/bus may stop at the same station, in which case, inbound handover of incoming UEs is desired. As such, it is valuable to communicate the change of mobile RN mobility state to the DeNB as it might not be aware of it if it is not involved in the positioning or mobility state determination. It is also valuable to forward the change of mobile RN mobility state to relevant neighboring nodes. This may be accomplished via methods already described above.

Alternatively, a certain timeout value along with the rejection cause may be specified in the HANDOVER PREPRATION FAILURE which indicates for how long the mobile relay node should be ignored for handover candidacy, for example, using a new optional Information Element, IE, in the HANDOVER PREPRATION FAILURE message. In another example alternative, instead of using the timeout value, the mobile RN keeps a history of the cells to which it has sent a HANDOVER PREPRATION FAILURE message with a "handover rejected due to RN mobility" rejection cause value. If the mobile relay's mobility state changes, the next time it comes across these cells, it notifies the change using a new X2 interface signaling message or other mechanisms described above.

In another non-limiting example embodiment, the mobile RN, upon detecting that it is entering the moving mobility state, changes the measurement configuration of UEs it is serving to stop or reduce measurement reporting. This may be realized in several example ways. A first example way is by configuring measurement and reporting offsets, hysteresis and threshold value. In LTE, the parameters SintraSearch and SnonintraSearch are used to trigger intra-frequency and inter-frequency measurements, respectively. A UE starts performing measurements on other cells that use the same frequency as the serving cell only if the signal quality of the serving cells falls below SintraSearch. Similary, SnonintraSearch is used for starting inter-frequency measurements. If these thresholds are set to very low values, then UE measurements are practically disabled. Another possibility is for UEs to perform measurements but for measurement reporting to be disabled by modifying the parameters that trigger measurement reporting, e.g., setting higher offset values for event A3, which determines by how much a neighbor cell's signal quality has to be better than the serving cell, setting periodic reporting parameters to very high values, etc. The details of example measurement reporting events and parameters can be found in section 6.2 of 3GPP TS 36.331. A second example way is to provide an empty "white list" of the cells to be considered for cell (re-)selection when the UE is in IDLE state and measurements when the UE is in CONNECTED state. A third example way is to introduce a new IE to inform UEs to stop measurements altogether, except measurements for the serving cell. The IE may include addition information such as for how long the UEs should disable the measurement reports. A fourth example way is to have the mobile relay node simply communicate that its current mobility state is "moving" to its UEs, via dedicated or broadcast messaging described above, and the UEs can change their cell (re-)selection and handover measurement configuration to an already pre-configured setting associated with being served by a moving mobile relay node.

With regard to the UEs that are not connected to or camping on the cell served by mobile relay node, i.e., UEs in neighboring nodes, they may also become aware of the mobile relay node's mobility state by reading the broadcasted system information, either from explicit mobility state indication or implicitly via a dedicated CSG ID for moving mobile relays as described above. When the UEs find out that a neighboring cell belongs to a mobile relay node currently in the moving state, they can stop considering it for cell (re-)selection measurements or handover measurements.

In another non-limiting example embodiment, a certain E-CGI is reserved for mobile RNs to use when they are in the moving mobility state. The mobile RN, on finding out that its mobility state has changed to moving, starts broadcasting this reserved, temporary or virtual, ECGI in its SIB1 instead of its actual ECGI. Neighbor nodes are aware of this temporary ECGI and will not try to handover their UEs towards the mobile RN.

In another non-limiting example embodiment, certain PCIs are reserved for mobile RNs to be used when they are in the moving mobility state. Once the mobile RN starts moving, it initiates handover for its connected UEs, i e for its UEs in CONNECTED mode, to one of these reserved PCIs and starts broadcasting this PCI until its mobility state changes. Fixed nodes may be made aware of these reserved PCIs, and they may put access barring limitations on their UEs from making measurement reports or even camping on a cell where a reserved PCI is broadcasted if they are in IDLE mode. Alternatively, instead measurement reports associated with these reserved PCIs may be ignored.

Several mobile relay nodes may need to be installed in one public transport vehicle, depending on the size of the vehicle, due to e.g., relay coverage limitations, and the amount of users that it can hold, i.e., depending on relay capacity limitations. In a non-limiting example embodiment, such situations may be handled by communicating group mobile relay node behavior to all the mobile relay nodes installed in a vehicle. The mobile relay nodes may be informed about the other mobile relay nodes in the vehicle at setup/attach time, and they may instruct their UEs to measure only the cells of these mobile relay nodes while in the moving mobility state. Also, inbound and outbound handovers with these mobile relay nodes may be enabled, e.g., when a user walks from one cabin to another.

Though inbound and outbound handovers may be disabled while a mobile relay node is in the moving mobility state, there may be cases where establishing a connection for a UE in IDLE mode that is inside the vehicle is desirable. In one non-limiting example embodiment, the UE, upon discovering, for example based on the indicated mobility state in the SIBs as explained above, a cell that belongs to a moving mobile relay node prompts the UE user on the UE display as to whether the UE should select the moving mobile relay node. If the user is inside the vehicle, the user will likely select the moving mobile relay node option, and the UE tries to setup a connection with the mobile relay node, e.g., by performing some user authentication to connect to moving mobile relay nodes instead of the automatic decision in normal cells.

In another non-limiting example embodiment, when a moving relay node is handed over to a new target donor base station, e g a DeNB, and if the DeNB or mobile relay node is aware that the mobile relay node will stay in the moving mobility state during its stay in the DeNB cell, i.e., the cell served by the donor eNB, for example, based on stored relay's route, the DeNB refrains from sending any eNB Configuration Updates towards the neighboring nodes. This reduces unnecessary signaling because none of the relayed UEs are handed over to another cell during the relay's stay in that DeNB cell. Updating the X2 information is not useful in this situation.

When the mobile relay node is arriving at the bus/train stop, i.e., in an arriving mobility state, relayed UEs may start measuring other cells for handover candidacy and non-relayed UEs in temporary neighboring cells may start measuring the relay cell for handover candidacy.

As described above, a mobile relay node may communicate that the current mobility state is "arriving" via a broadcast message to UEs in IDLE mode camping on the cell served by the mobile relay node or UEs in IDLE mode camping on neighboring cells, and via dedicated message to its connected UEs. The relayed UEs may then start measuring other cells, and UEs in neighboring cells may start measuring the mobile relay's cell. However, handover is not enabled, except in cases where there are several relays installed within one vehicle, and these measurements are used only when the mobile relay enters the standing mobility state.

In another non-limiting example embodiment, only UEs that are going to disembark the vehicles are affected. For example, users manually indicate that they are going to disembark at the next bus stop, and their UEs are instructed to start measuring neighboring cells after that.

When the mobile relay node stops moving for a short while at a bus/train stop, i.e., the mobile relay node enters the standing mobility state, changes from the arriving mobility state may include (1) allowing outbound handovers; (2) relayed UEs in IDLE mode performing cell reselection to other cells; (3) non-relayed UEs in neighboring cells measuring the relay cell for handover candidacy; (4) non-relayed UEs in neighboring cells in IDLE state may start camping on the relay cell.

When the mobile relay node is in a standing mobility state, i.e., the vehicle is standing at the bus/train stop, disembarking users are preferably connected to the best cell that they have been measuring during the arriving mobility state. Thus, outbound handovers are enabled. But inbound handovers are preferably prevented in this state to make sure that standby UEs, i.e., UEs of users who are not embarking on the vehicle, are not handed over to the mobile RN by mistake.

In one non-limiting example embodiment, UEs entering the vehicle are identified by a sensor, e.g., an RFID sensor, and these UEs are allowed to handover immediately to the relay cell, i.e., to the cell served by the mobile relay node.

In another non-limiting example embodiment, UEs with users having manually indicated that they are entering the vehicle, e.g., in response to a prompt that appears on the UE when the mobile relay node broadcasts that it is in the standing mobility state, are allowed to handover immediately to the relay cell.

In another non-limiting example embodiment, only UEs with a certain profile may be admitted to a mobile relay cell. For example, UEs subscribed to premium accounts that include battery savings as one of the options are allowed to be handed over to mobile relay nodes, while non-premium UEs are either not allowed to camp or handover to the mobile relay node or are only allowed to do so if there are not enough premium UEs to load the mobile relay. node In another non-limiting example embodiment, when a mobile relay node enters the standing mobility state, the DeNB(s) to which the mobile relay node is attached can keep a set of "phantom" or "virtual" X2 connections with the neighbor cells of the mobile relay node at that time, i.e., during the time that the mobile relay node is attached to a DeNB, and keep on these connections on behalf of the mobile relay node even when the mobile relay node has already left the cells served by the DeNB(s). The next time the mobile relay node comes to the stop, X2 handovers may then be performed very quickly without the need to re-establish X2 connection with neighbors, or without the need to send eNB CONFIGURATION UPDATE message by the DeNB towards each neighbor to signify the arrival of the mobile relay node to its cell.

When a vehicle carrying a mobile relay node starts departing after stopping at a station, i.e., when the mobile relay node enters the departing mobility state, example changes from the standing mobility state include: (1) preventing outbound handovers; (2) allowing inbound handovers; (3) relayed UEs stop measuring other cells for handover candidacy; (4) relayed UEs in IDLE mode not performing cell reselection to other cells; (5) non-relayed UEs in neighboring cells continuing to measure the relay cell for handover candidacy, e g in case they are on the vehicle but not handed over yet; (6) non-relayed UEs in neighboring cells in IDLE state continuing to camp on the relay cell.

Example operation/behavior for the temporarily stopped mobility state is similar to that of the moving mobility state.

Figure 10:
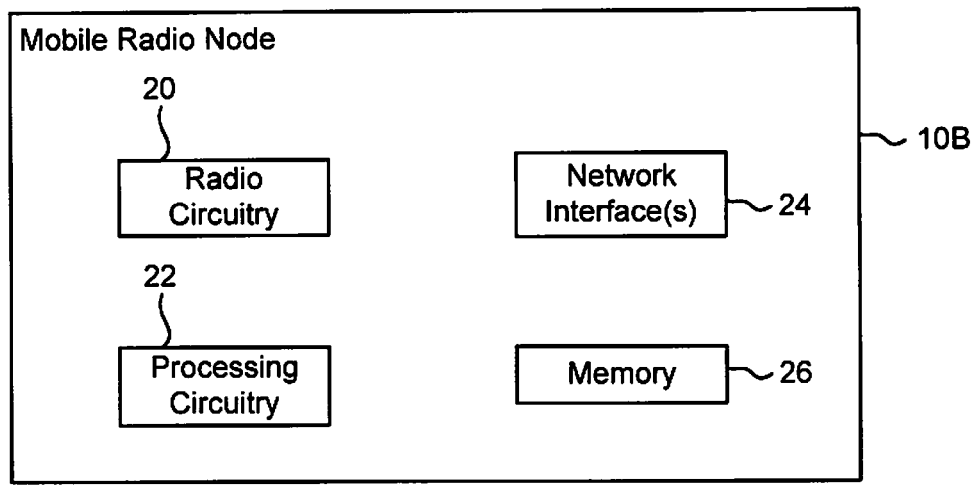
FIG. 10 is a function block diagram of an example mobile radio node.

FIG. 10 is a function block diagram of an example mobile radio node 10B. Radio circuitry 20 permits radio communications with other radio nodes like UEs for example and may include for example one or more antennas, transmitter and receiver functions, conversion between Radio Frequency (RF) and baseband, baseband processing, etc. One or more network interfaces 24 allow the mobile radio node 10B to communicate with other network nodes including for example other relay nodes, base station nodes, base station control nodes, core network nodes, stand alone nodes, etc. Examples of a standalone node include an isolated base station, e.g., located in an indoor location, and a radio node transmitting to and/or receiving signals from a wireless device to facilitate positioning of the wireless device. Processing circuitry 22 performs the functions of the mobile radio node 10B described above. Memory 26, which may be one or more memories, may store instructions for execution by the processing circuitry 22 as well as data, including for example, measurement data from UEs, conditions, parameters, etc. Blocks 20-26 may communicate using one or more communication buses.

Figure 11:
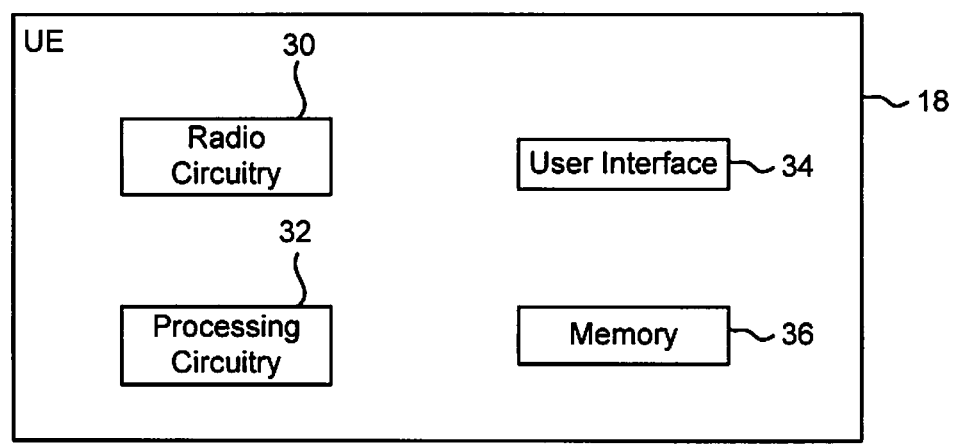
FIG. 11 is a function block diagram of an example UE.

FIG. 11 is a function block diagram of an example UE 18. Radio circuitry 30 permits radio communications with radio nodes like relay nodes, base stations, etc. and may include for example one or more antennas, transmitter and receiver functions, conversion between RF and baseband, baseband processing, etc. A user interface 34 allows user to direct the UE to perform various data processing and communication operation and typically includes some sort of output mechanism, e.g., display, and input mechanism, e.g., keypad, touch screen, voice recognition, etc. Processing circuitry 32 performs the UE functions described above. Memory 26, which may be one or more memories, may store instructions for execution by the processing circuitry 32 as well as data, including for example, measurement data to be reported, conditions, parameters, etc. Blocks 30-36 may communicate using one or more communication buses.

Still other aspects of the technology include one or more computer products embodied in a non-transitory, computer-readable storage medium containing instructions, which when executed by processing circuitry, perform the functions described above for the mobile radio node and UEs. For example, one non-transitory, computer-readable storage medium is configured for use with a mobile relay node, and another non-transitory, computer-readable storage medium is configured for use with UEs.

The technology described above offers a number of example advantages in a system with mobile relays. First, the mobile relay mobility state may be detected using various mechanisms. Second, UEs inside the transport vehicle can stay connected to the mobile relay node regardless of relay mobility state. Third, the number of required handover measurements and the measurement reporting overhead are reduced. Fourth, the total number of required cell (re-)selections is reduced as is the total number of required cell re-configuration updates. Fifth, undesired handovers and ping-pong handovers of UEs outside the transport vehicle are prevented.

Although the description above contains many specifics, these should not be construed as limiting the scope of the claims but as merely providing illustrations of example embodiments. It will be appreciated that the technology claimed fully encompasses other embodiments which may become apparent to those skilled in the art, and that the scope of the claims is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are intended to be encompassed hereby. Moreover, it is not necessary for a device or method to address each and every problem sought to be solved for it to be encompassed hereby. No element, block, or instruction used in the present application should be construed as critical or essential to the implementations described herein unless explicitly described as such. Further, the phrase "based on" is intended to mean "based, at least in part, on" unless explicitly stated otherwise. Unclaimed subject matter is not dedicated to the public, and all rights are reserved in unclaimed subject matter including the right to claim such subject matter in this and other applications, e.g., continuations, continuations in part, divisions, etc.

The invention claimed is:

1. A mobile radio node comprising:
   radio circuitry configured to communicate with one or more user equipments, UEs, and processing circuitry configured to:
   receive information from one or more UEs;
   determine, based on the information from one or more UEs, a mobility state of the mobile radio node as one of three or more different mobility states;
   determine control information based on the determined mobility state of the mobile radio node; and
   perform or initiate an action based on the determined control information.

2. The mobile radio node in claim 1, wherein the action includes at least one of:
   adapting a UE measurement procedure, adapting a UE mobility procedure, and modifying or adapting a system parameter used by a UE for mobility or for performing measurements.

3. The mobile radio node in claim 1, wherein the three or more different mobility states include moving, standing, and at least one additional mobility state.

4. The mobile radio node in claim 3, wherein the at least one additional mobility state is one or more of the following: departing, arriving, or temporarily stopped.

5. The mobile radio node in claim 3, wherein the action is to prevent or penalize handovers to or from the mobile radio node when the mobile radio node is in the moving mobility state.

6. The mobile radio node in claim 1, wherein the mobile radio node is configured to determine the mobility state based on received information from another network node.

7. The mobile radio node in claim 1, wherein the mobile radio node is a mobile relay node or a mobile radio base station.

8. The mobile radio node in claim 1, wherein the mobile radio node is one of: an access point, a macro base station, a micro base station, a pico base station, a femto base station, a home base station, a relay node, or a repeater.

9. The mobile radio node in claim 1, wherein the processing circuitry is configured to determine the mobility state of the mobile radio node using a location of the mobile radio node and coordinates of stopping locations for a vehicle carrying the mobile radio node.

10. The mobile radio node in claim 1, wherein the processing circuitry is configured to determine the mobility state of the mobile radio node based on whether a stopping point for a vehicle carrying the mobile radio node is within a coverage area of a donor base station currently serving the mobile radio node.

11. The mobile radio node in claim 1, wherein the processing circuitry is configured to send via broadcast or dedicated signaling, via the radio circuitry, the detected mobility state of the mobile radio node to at least one of the one or more UEs for use by the at least one of the one or more UEs in conducting a mobility procedure, a measurement procedure, a handover procedure, a cell selection procedure or a cell reselection procedure.

12. The mobile radio node in claim 1, wherein the processing circuitry is configured to send, via the radio circuitry, the detected mobility state of the mobile radio node to one or more neighboring UEs in a neighboring cell for use by the one or more neighboring UEs in conducting a mobility procedure, a measurement procedure, a handover procedure, a cell selection procedure or a cell reselection procedure.

13. A user equipment, UE, comprising:
   radio circuitry configured to communicate with a mobile radio node, and processing circuitry configured to:
   transmit information to the mobile radio node;
   receive, a mobility state of the mobile radio node as one of three or more different mobility states, the mobility state determined based on the information from the UE;
   determine control information based on the determined mobility state of the mobile radio node; and
   perform or initiate an action based on the determined control information.

14. The UE in claim 13, wherein the action includes at least one of: adapting a UE measurement procedure, adapting a UE mobility procedure, and modifying or adapting a system parameter used by a UE for mobility or for performing measurements.

15. The UE in claim 13, wherein the three or more different mobility states of the mobile radio node include moving, standing, and at least one additional mobility state.

16. The UE in claim 15, wherein the at least one additional mobility state is one or more of the following; departing, arriving, or temporarily stopped.

17. The UE in claim 16, wherein if the UE has a connection with the mobile radio node, the action is to prevent or penalize handover of the connection when the mobile radio node is in the moving or the temporarily stopped mobility state.

18. The UE in claim 16, wherein if the UE has a connection with the mobile radio node and the mobile radio node is in the moving mobility state or the temporarily stopped mobility state, the action is to stop measuring cells for handover candidacy, or if the UE is in idle mode and camping on a cell served by the mobile radio node, the action is to prevent cell reselection to other cells not served by the mobile radio node.

19. The UE in claim 16, wherein if the UE is in idle mode and camping on a cell served by the mobile radio node and the mobile radio node is in the moving mobility state or the temporarily stopped mobility state, the action is to prevent or penalize measurement on other cells.

20. The UE in claim 16, wherein if the UE is in idle mode but is not camping on a cell associated with the mobile radio node and the mobile radio node is in the moving mobility state or the temporarily stopped mobility state, the action is to prevent camping on the cell associated with the mobile radio node.

21. The UE in claim 16, wherein if the UE has a connection with the mobile radio node or if the UE is in idle mode and camping on a cell served by the mobile radio node, the action is to measure signals from cells other than the cell being served by the mobile radio node for handover of the connection or for cell reselection when the mobile radio node is in the arriving mobility state.

22. The UE in claim 16, wherein if the UE does not have a connection with the mobile radio node, the action is to measure signals transmitted by the mobile radio node for possible handover connection when the mobile radio node is in the arriving mobility state.

23. The UE in claim 16, wherein if the UE has a connection with the mobile radio node, the action is to permit handover of the connection when the mobile radio node is in the standing mobility state.

24. The UE in claim 16, wherein if the UE is in idle mode and the mobile radio node is in the standing mobility state, the action is to perform cell reselection to other cells.

25. The UE in claim 16, wherein when the mobile radio node is in the standing mobility state and the UE is in idle mode, the action is to allow camping on a cell associated with the mobile radio node.

26. The UE in claim 16, wherein if the UE has a connection with the mobile radio node, the action is to prevent an outbound handover of the connection when the mobile radio node is in the departing mobility state.

27. The UE in claim 16, wherein if the UE has a connection with the mobile radio node, the action is to not measure tor handover of the connection when the radio node is in the departing mobility state.

28. The UE in claim 16, wherein if the UE is in idle mode but not camping on a cell served by the mobile radio node and the mobile radio node is in the departing mobility state, the action is to prevent cell reselection to the cell served by the mobile radio node.

29. The UE in claim 16, wherein when the mobile radio node is in the departing mobility state and the UE is moving with the mobile radio node and camping on a cell served by the mobile radio node, the action is to not perform a cell reselection.

30. The UE in claim 13, wherein the radio circuitry is configured to determine the mobility state based on information related to the mobility state of the mobile radio node received from a base station.

31. A method implemented in a mobile radio node, the method comprising:
communicating with one or more user equipments, UEs, over a radio interface;
receiving information from the one or more UEs;
determining based on the information from the one or more UEs, a mobility state of the mobile radio node as one of three or more different mobility states;
determining control information based on the determined mobility state of the mobile radio node; and
performing or initiating an action based on the determined control Information.

32. The method in claim 31, wherein the action includes at least one of: adapting a UE measurement procedure, adapting a UE mobility procedure, and modifying or adapting a system parameter used by a UE for mobility or for performing measurements.

33. The method in claim 31, wherein the three or more different mobility states include moving, standing, and at least one additional mobility state.

34. The method in claim 33, wherein the at least one additional mobility state is one or more of the following: departing, arriving, or temporarily stopped.

35. The method in claim 31, wherein the mobile radio node determines the mobility state based on received information from another network node.

36. A method implemented in a user equipment, UE, the method comprising:
transmitting information to a mobile radio node over a radio interface;
receiving a mobility state of the mobile radio node as one of three or more different mobility states, the mobility state determined based on the information from the UE;
determining control information based on the determined mobility state of the mobile radio node; and
performing or initiating an action based on the determined control information.

37. The method in claim 36, wherein the action includes at least one of: adapting a UE measurement procedure, adapting a UE mobility procedure, and modifying or adapting a system parameter used by a UE for mobility or for performing measurements.

38. The method in claim 36, wherein the three or more different mobility states of the mobile radio node include moving, standing, and at least one additional mobility state.

39. The method in claim 38, wherein the at least one additional mobility state is one or more of the following: departing, arriving, or temporarily stopped.

40. A non-transitory, computer-readable storage medium containing instructions, which when executed by one or more computers, cause the one or more computers to perform the method recited in claim 36.

41. A non-transitory, computer-readable storage medium containing instructions, which when executed by one or more computers, cause the one or more computers to perform the method recited in claim 31.

* * * * *